(12) United States Patent
Tanaka

(10) Patent No.: US 11,011,794 B2
(45) Date of Patent: May 18, 2021

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Tokyo (JP)

(72) Inventor: Keiichiro Tanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 73 days.

(21) Appl. No.: 16/349,714

(22) PCT Filed: Nov. 14, 2017

(86) PCT No.: PCT/JP2017/040894
§ 371 (c)(1),
(2) Date: May 14, 2019

(87) PCT Pub. No.: WO2018/096975
PCT Pub. Date: May 31, 2018

(65) Prior Publication Data
US 2019/0319236 A1    Oct. 17, 2019

(30) Foreign Application Priority Data
Nov. 24, 2016  (JP) .............................. JP2016-228228

(51) Int. Cl.
*H01M 2/16* (2006.01)
*H01M 50/409* (2021.01)
(Continued)

(52) U.S. Cl.
CPC .......... *H01M 50/409* (2021.01); *B01D 69/12* (2013.01); *B01J 13/185* (2013.01); *C08F 220/14* (2013.01); *C08F 220/44* (2013.01); *H01M 4/13* (2013.01)

(58) Field of Classification Search
CPC .......... H01M 2/16; B01D 69/00; B01D 69/12
See application file for complete search history.

(56) References Cited

U.S. PATENT DOCUMENTS

| 2012/0121903 A1 | 5/2012 | Betremieux et al. |
| 2013/0330622 A1 | 12/2013 | Sasaki |

(Continued)

FOREIGN PATENT DOCUMENTS

| JP | 2013073921 A | 4/2013 |
| JP | 2013145763 A | 7/2013 |

(Continued)

OTHER PUBLICATIONS

Dec. 19, 2017, International Search Report issued in the International Patent Application No. PCT/JP2017/040894.

(Continued)

*Primary Examiner* — Amanda C. Walke
(74) *Attorney, Agent, or Firm* — Kenja IP Law PC

(57) ABSTRACT

Provided is a composition for a non-aqueous secondary battery functional layer capable of forming a functional layer that can provide a battery member such as an electrode or a separator with both excellent blocking resistance and excellent process adhesiveness. The composition for a functional layer contains a particulate polymer A. The particulate polymer A has a core-shell structure including a core portion and a shell portion that at least partially covers an outer surface of the core portion. The core portion is formed from a polymer having a glass-transition temperature of higher than 25° C. and lower than 80° C. The shell portion is formed from a polymer having a glass-transition temperature of −80° C. to 25° C. The proportion constituted by the core portion among the total of the core portion and the shell portion is 30 mass % to 80 mass %.

6 Claims, 1 Drawing Sheet

(51) Int. Cl.
  *B01J 13/18*   (2006.01)
  *C08F 220/14*  (2006.01)
  *C08F 220/44*  (2006.01)
  *H01M 4/13*    (2010.01)
  *B01D 69/12*   (2006.01)

(56) References Cited

U.S. PATENT DOCUMENTS

2015/0188108 A1   7/2015  Miyazawa et al.
2018/0261815 A1*  9/2018  Ikemi .................... C08F 220/18

FOREIGN PATENT DOCUMENTS

| JP | 2015041603 A | 3/2015 |
| JP | 2016072247 A | 5/2016 |
| JP | 2016100149 A | 5/2016 |
| JP | 2016122648 A | 7/2016 |
| WO | 2012115096 A1 | 8/2012 |

OTHER PUBLICATIONS

Jun. 4, 2020, the Extended European Search Report issued by the European Patent Office in the corresponding European Patent Application No. 17873469.5.

May 28, 2019, International Preliminary Report on Patentability issued in the International Patent Application No. PCT/JP2017/040894.

* cited by examiner

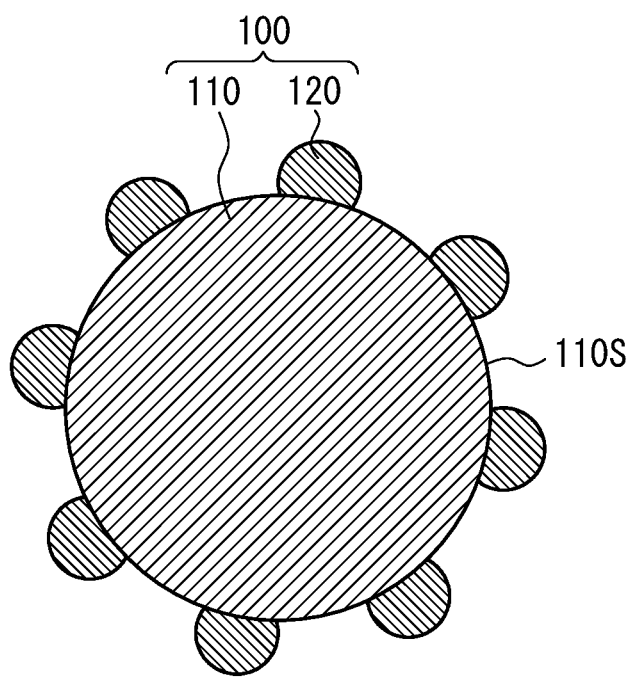

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

The present disclosure relates to a composition for a non-aqueous secondary battery functional layer, a functional layer for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy-density, and the ability to be repeatedly charged and discharged, and are used in a wide range of applications.

A secondary battery generally includes battery members such as electrodes (positive and negative electrodes) and a separator that isolates the positive electrode and the negative electrode from one another and prevents short-circuiting between the positive and negative electrodes. There are cases in which a porous membrane layer for improving heat resistance and strength, an adhesive layer for improving adhesiveness between battery members, or the like (hereinafter, also referred to using the general term "functional layer") is provided on the surface of an electrode and/or separator. Specifically, electrodes that further include a functional layer formed on an electrode substrate including an electrode mixed material layer on a current collector and separators that include a functional layer formed on a separator substrate are used as battery members.

For example, Patent Literature (PTL) 1 and 2 each disclose a separator including a layer of a specific thermoplastic polymer. PTL 1 and 2 also explain that a polymer having a core-shell structure may be used as the thermoplastic polymer.

CITATION LIST

Patent Literature

PTL 1: JP 2016-72247 A
PTL 2: JP 2016-122648 A

SUMMARY

Technical Problem

In the production process of a secondary battery, a battery member produced in an elongated form is typically wound up, as produced, for storage and transport. However, in a situation in which a battery member including a functional layer is stored and transported in a wound-up state, adjacent battery member sticking via the functional layer (i.e., blocking) may occur, which may lead to the occurrence of faults and reduced productivity. Accordingly, a battery member that includes a functional layer is required display performance in terms of inhibiting blocking during the production process (i.e., display blocking resistance).

On the other hand, there are cases in which, during the production process of a secondary battery, battery members that have not yet been immersed in electrolyte solution are stacked under high pressure conditions using a roll press or the like, are cut to a desired size as necessary, and are transported in the form of a laminate. In this cutting and transportation, there have been cases in which a shift in position or the like of the stacked battery members has occurred, leading to problems such as the occurrence of faults and reduced productivity. Accordingly, a battery member including a functional layer is required to ensure blocking resistance as described above while also providing high adhesiveness between battery members during the production process of a secondary battery (i.e., display process adhesiveness).

However, there is room for improvement of the battery members described in PTL 1 and 2, which each include a layer of a specific thermoplastic polymer as a functional layer, in terms of achieving high levels of both blocking resistance and process adhesiveness between battery members in the production process of a secondary battery.

Therefore, one objective of the present disclosure is to provide a composition for a non-aqueous secondary battery functional layer capable of forming a functional layer that can provide a battery member such as an electrode or a separator with both excellent blocking resistance and excellent process adhesiveness.

Another objective of the present disclosure is to provide a functional layer that can provide a battery member such as an electrode or a separator with both excellent blocking resistance and excellent process adhesiveness and a non-aqueous secondary battery including this functional layer.

Solution to Problem

The inventor carried out diligent investigation with the aim of solving the problem described above and focused on properties of a particulate polymer having a core-shell structure used in formation of a functional layer. As a result, the inventor discovered that by using a composition for a functional layer that contains a particulate polymer for which the glass-transition temperatures of polymers forming a core portion and a shell portion thereof are each within a specific range and for which the mass proportion constituted by the core portion among the total of the core portion and the shell portion is within a specific range, it is possible to form a functional layer that can cause a battery member such as an electrode or a separator to display good blocking resistance and process adhesiveness. In this manner, the inventor completed the present disclosure.

Specifically, the present disclosure aims to advantageously solve the problem set forth above by disclosing a composition for a non-aqueous secondary battery functional layer comprising a particulate polymer A, wherein the particulate polymer A has a core-shell structure including a core portion and a shell portion that at least partially covers an outer surface of the core portion, the core portion is formed from a polymer having a glass-transition temperature of higher than 25° C. and lower than 80° C., the shell portion is formed from a polymer having a glass-transition temperature of not lower than −80° C. and not higher than 25° C., and a proportion constituted by the core portion among a total of the core portion and the shell portion is not less than 30 mass % and not more than 80 mass %. By forming a functional layer using a composition for a functional layer that contains a particulate polymer for which glass-transition temperatures of polymers forming a core portion and a shell portion thereof are each within a specific range and a proportion constituted by mass of the core portion among the total of mass of the core portion and mass of the shell portion is within a specific range as set forth above, a battery member that includes the functional layer can be provided with both excellent blocking resistance and excellent process adhesiveness.

The "glass transition temperature" referred to in the present disclosure can be measured using a measurement method described in the EXAMPLES section of the present specification.

The presently disclosed composition for a non-aqueous secondary battery functional layer preferably further comprises a particulate polymer B having a glass-transition temperature of 80° C. or higher. By using a composition for a functional layer that contains the particulate polymer B having a glass-transition temperature of 80° C. or higher in addition to the particulate polymer A, blocking resistance of a battery member including an obtained functional layer can be further improved.

In the presently disclosed composition for a non-aqueous secondary battery functional layer, a proportion constituted by the particulate polymer A among a total of the particulate polymer A and the particulate polymer B is preferably not less than 5 mass % and not more than 95 mass %. When the composition for a functional layer contains the particulate polymer A and the particulate polymer B in the ratio set forth above, blocking resistance and process adhesiveness of a battery member including an obtained functional layer can be further increased, and adhesiveness of the battery member including the functional layer while immersed in electrolyte solution after production of a secondary battery (i.e., wet adhesiveness) can be improved.

In the presently disclosed composition for a non-aqueous secondary battery functional layer, the particulate polymer A preferably has a volume-average particle diameter that is at least as large as a volume-average particle diameter of the particulate polymer B. When the volume-average particle diameter of the particulate polymer A is at least as large as the volume-average particle diameter of the particulate polymer B, process adhesiveness of a battery member including an obtained functional layer can be further improved.

The "volume-average particle diameter" referred to in the present disclosure can be measured using a measurement method described in the EXAMPLES section of the present specification.

In the presently disclosed composition for a non-aqueous secondary battery functional layer, the particulate polymer A preferably has a volume-average particle diameter of 200 nm or more. When the volume-average particle diameter of the particulate polymer A is 200 nm or more, process adhesiveness of a battery member including an obtained functional layer can be further improved.

In the presently disclosed composition for a non-aqueous secondary battery functional layer, the shell portion preferably partially covers the outer surface of the core portion. By using the composition for a functional layer containing the particulate polymer A in which the shell portion partially covers the core portion, blocking resistance and process adhesiveness of a battery member including an obtained functional layer can be further improved.

Moreover, the present disclosure aims to advantageously solve the problem set forth above by disclosing a functional layer for a non-aqueous secondary battery formed using any one of the compositions for a non-aqueous secondary battery functional layer set forth above. When a composition for a functional layer containing the particulate polymer A having a specific core-shell structure is used in this manner, a functional layer that can cause a battery member to display excellent blocking resistance and process adhesiveness is obtained.

Moreover, when a battery member including the presently disclosed functional layer for a non-aqueous secondary battery is used in production of a secondary battery, blocking of the battery member can be inhibited and position shifting of battery members stacked by roll pressing or the like can be prevented during the production process. Therefore, a non-aqueous secondary battery can be efficiently produced using a battery member that includes the presently disclosed functional layer.

Advantageous Effect

According to the present disclosure, it is possible to provide a composition for a non-aqueous secondary battery functional layer capable of forming a functional layer that can provide a battery member such as an electrode or a separator with both excellent blocking resistance and excellent process adhesiveness.

Moreover, according to the present disclosure, it is possible to provide a functional layer that can provide a battery member such as an electrode or a separator with both excellent blocking resistance and excellent process adhesiveness and a non-aqueous secondary battery including this functional layer.

BRIEF DESCRIPTION OF THE DRAWING

In the accompanying drawing,
FIG. 1 is a cross-sectional view schematically illustrating structure of one example of a particulate polymer A contained in a presently disclosed composition for a non-aqueous secondary battery functional layer.

DETAILED DESCRIPTION

The following provides a detailed description of embodiments of the present disclosure.

The presently disclosed composition for a non-aqueous secondary battery functional layer is used as a material in production of the presently disclosed functional layer for a non-aqueous secondary battery. Moreover, the presently disclosed functional layer for a non-aqueous secondary battery is produced using the presently disclosed composition for a non-aqueous secondary battery functional layer and may, for example, constitute part of a separator or an electrode. Furthermore, the presently disclosed non-aqueous secondary battery includes at least the presently disclosed functional layer for a non-aqueous secondary battery.

Composition for Non-Aqueous Secondary Battery Functional Layer)

The presently disclosed composition for a non-aqueous secondary battery functional layer is a slurry that has water or the like as a dispersion medium, that contains a particulate polymer A having a core-shell structure, and that may optionally contain a particulate polymer B having a glass-transition temperature of 80° C. or higher and/or other components. Features of the particulate polymer A having a core-shell structure that is contained in the presently disclosed composition for a functional layer are that a polymer of a core portion thereof has a glass-transition temperature of higher than 25° C. and lower than 80° C., a polymer of a shell portion thereof has a glass-transition temperature of not lower than −80° C. and not higher than 25° C., and the proportion constituted by the core portion among the total of the core portion and the shell portion is not less than 30 mass % and not more than 80 mass %.

As a result of the presently disclosed composition for a functional layer containing the particulate polymer A that includes, in the specific mass ratio set forth above, a core portion formed from a polymer having a glass-transition temperature of higher than 25° C. and lower than 80° C. and a shell portion formed from a polymer having a glass-transition temperature of not lower than −80° C. and not higher than 25° C., a battery member including a functional layer obtained from the composition for a functional layer can be provided with both excellent blocking resistance and excellent process adhesiveness.

Although it is not clear why both blocking resistance and process adhesiveness of a battery member including a functional layer can be ensured by using the particulate polymer A set forth above, the reason for this is presumed to be as follows. Firstly, the polymer forming the core portion of the particulate polymer A tends to maintain its shape during the production process of a secondary battery due to having a glass-transition temperature of higher than 25° C. and lower than 80° C. This characteristic of the core portion means that the particulate polymer A is not easily deformed in a functional layer even during storage and transport of a battery member in a wound-up state. Consequently, the display of excessive adhesiveness due to increased contact area can be suppressed and battery member blocking via the functional layer can be inhibited. On the other hand, the polymer forming the shell portion of the particulate polymer A softens comparatively easily and readily displays adhesiveness due to having a glass-transition temperature of not lower than −80° C. and not higher than 25° C. This characteristic of the shell portion means that the particulate polymer A can display sufficient adhesiveness under pressure by roll pressing or the like and enables good adhesion between battery members via the functional layer. Moreover, the respective characteristics of the core portion and the shell portion described above can both be sufficiently displayed because the core portion and the shell portion are contained in the particulate polymer A with a mass ratio (core portion:shell portion) that is within a range of 30:70 to 80:20. Accordingly, a battery member including a functional layer can be provided with both excellent blocking resistance and excellent process adhesiveness by using the particulate polymer A having the specific core-shell structure set forth above.

<Particulate Polymer A>

As described above, the particulate polymer A is a component that can impart excellent blocking resistance and process adhesiveness to a battery member including a functional layer obtained from the composition for a functional layer containing the particulate polymer A. In addition, the particulate polymer A displays good binding capacity after immersion in electrolyte solution. Therefore, the particulate polymer A also has a function of causing a functional layer to display excellent wet adhesiveness while the functional layer is immersed in electrolyte solution after secondary battery production.

<<Production of Particulate Polymer A>>

The particulate polymer A has a core-shell structure including a core portion and a shell portion that covers the outer surface of the core portion. From a viewpoint of further increasing blocking resistance and process adhesiveness of a battery member including a functional layer, it is preferable that the shell portion partially covers the outer surface of the core portion. In other words, it is preferable that the shell portion of the particulate polymer A covers the outer surface of the core portion but does not completely cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Therefore, a particulate polymer A including a shell portion having pores that pass from the outer surface of the shell portion (i.e., the peripheral surface of the particulate polymer A) to the outer surface of the core portion corresponds to the preferable particulate polymer A mentioned above in which the shell portion partially covers the outer surface of the core portion.

FIG. 1 illustrates cross-sectional structure of one example of a preferable particulate polymer A. In FIG. 1, a particulate polymer A100 has a core-shell structure including a core portion 110 and a shell portion 120. The core portion 110 is a portion that is further inward than the shell portion 120 in this particulate polymer A100. The shell portion 120 is a portion that covers an outer surface 110S of the core portion 110 and is normally a furthest outward portion of the particulate polymer A100. The shell portion 120 partially covers the outer surface 110S of the core portion 110, but does not completely cover the outer surface 110S of the core portion 110.

The particulate polymer A may include optional elements other than the core portion and the shell portion described above so long as the desired effects are not significantly lost as a result. Specifically, the particulate polymer A may, for example, include a portion inside of the core portion that is formed from a different polymer to the core portion. In one specific example, a residual seed particle may be present inside of the core portion in a situation in which seed particles are used in production of the particulate polymer A by seeded polymerization. However, from a viewpoint of more noticeably displaying the desired effects, it is preferable that the particulate polymer A is composed by only the core portion and the shell portion.

The proportion constituted by the core portion (core portion proportion) among the total of the core portion and the shell portion in the particulate polymer A is required to be not less than 30 mass % and not more than 80 mass %, is preferably 40 mass % or more, and more preferably 50 mass % or more, and is preferably 75 mass % or less, and more preferably 70 mass % or less. If the core portion proportion in the particulate polymer A is less than 30 mass %, blocking resistance of a battery member including a functional layer decreases and process adhesiveness of the battery member cannot be ensured. On the other hand, if the core portion proportion in the particulate polymer A is more than 80 mass %, process adhesiveness of a battery member including a functional layer decreases due to the proportion constituted by the shell portion decreasing.

[Core Portion]

—Glass-Transition Temperature—

The core portion of the particulate polymer A is formed from a polymer having a specific glass-transition temperature. Specifically, the glass-transition temperature of the polymer of the core portion is required to be higher than 25° C. and lower than 80° C., is preferably 40° C. or higher, more preferably 50° C. or higher, and even more preferably 55° C. or higher, and is preferably 75° C. or lower, more preferably 70° C. or lower, and even more preferably 65° C. or lower. Blocking resistance of a battery member including a functional layer decreases if the glass-transition temperature of the polymer of the core portion is 25° C. or lower. On the other hand, wet adhesiveness of a battery member including a functional layer decreases if the glass-transition temperature of the polymer of the core portion is 80° C. or higher.

—Chemical Composition—

One or more monomers used to produce the polymer of the core portion can be selected as appropriate such that the glass-transition temperature of the resultant polymer is within any of the ranges set forth above. Examples of such monomers include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; (meth) acrylic acid ester monomers such as methyl acrylate, ethyl acrylate, butyl acrylate, 2-ethylhexyl acrylate, methyl methacrylate, ethyl methacrylate, butyl methacrylate, and cyclohexyl methacrylate; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl) ethyl acrylate; maleimide; and maleimide derivatives such as phenylmaleimide. One of these monomers may be used individually, or two or more of these monomers may be used in combination in a freely selected ratio.

In the present disclosure, "(meth)acryl" is used to indicate "acryl" and/or "methacryl" and "(meth)acrylonitrile" is used to indicate "acrylonitrile" and/or "methacrylonitrile".

Of these monomers, it is preferable to use a (meth)acrylic acid ester monomer and/or (meth)acrylonitrile monomer, and more preferable to use both a (meth)acrylic acid ester monomer and a (meth)acrylonitrile monomer as monomers used in production of the polymer of the core portion from a viewpoint of further improving blocking resistance and process adhesiveness of a battery member including a functional layer. In other words, the polymer of the core portion preferably includes a (meth)acrylic acid ester monomer unit and/or a (meth)acrylonitrile monomer unit, and more preferably includes both a (meth)acrylic acid ester monomer unit and a (meth)acrylonitrile monomer unit.

The phrase "includes a monomer unit" as used in the present disclosure means that "a polymer obtained with the monomer includes a repeating unit derived from the monomer".

The proportion constituted by the (meth)acrylic acid ester monomer unit in the polymer of the core portion is preferably 40 mass % or more, more preferably 45 mass % or more, and even more preferably 50 mass % or more, and is preferably 70 mass % or less, more preferably 65 mass % or less, and even more preferably 60 mass % or less from a viewpoint of further improving blocking resistance and process adhesiveness of a battery member including a functional layer.

The proportion constituted by the (meth)acrylonitrile monomer unit in the polymer of the core portion is preferably 20 mass % or more, more preferably 25 mass % or more, and even more preferably 30 mass % or more, and is preferably 55 mass % or less, more preferably 45 mass % or less, and even more preferably 40 mass % or less from a viewpoint of further improving blocking resistance and process adhesiveness of a battery member including a functional layer.

The polymer of the core portion may include an acid group-containing monomer unit. Examples of acid group-containing monomers include monomers having an acid group such as carboxy group-containing monomers, sulfo group-containing monomers, phosphate group-containing monomers, and hydroxy group-containing monomers.

Examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Examples of hydroxy group-containing monomers include 2-hydroxyethyl acrylate, 2-hydroxypropyl acrylate, 2-hydroxyethyl methacrylate, and 2-hydroxypropyl methacrylate.

In the present disclosure, "(meth)allyl" is used to indicate "allyl" and/or "methallyl" and "(meth)acryloyl" is used to indicate "acryloyl" and/or "methacryloyl".

Of these acid group-containing monomers, carboxy group-containing monomers are preferable, among which, monocarboxylic acids are preferable, and (meth)acrylic acid is more preferable.

One acid group-containing monomer may be used individually, or two or more acid group-containing monomers may be used in combination in a freely selected ratio.

The proportion constituted by the acid group-containing monomer unit in the polymer of the core portion is preferably 0.1 mass % or more, and more preferably 1 mass % or more, and is preferably 15 mass % or less, more preferably 10 mass % or less, and even more preferably 5 mass % or less. As a result of the proportion constituted by the acid group-containing monomer unit being kept within any of the ranges set forth above, it is possible to increase the dispersibility of the polymer of the core portion such that a shell portion partially covering the outer surface of the core portion can be more easily formed with respect to the outer surface of the polymer of the core portion in production of the particulate polymer A.

The polymer of the core portion preferably includes a crosslinkable monomer unit in addition to the monomer units described above. The crosslinkable monomer is a monomer that can form a crosslinked structure during or after polymerization by heating or by irradiation with energy rays. When the polymer of the core portion contains a crosslinkable monomer unit, the subsequently described degree of swelling in electrolyte solution of the particulate polymer A can easily be kept within a suitable range.

Examples of crosslinkable monomers that can be used include polyfunctional monomers having at least two groups that display polymerization reactivity. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; ethylenically unsaturated monomers having an epoxy group such as allyl glycidyl ether and glycidyl methacrylate; and γ-methacryloxypropyltrimethoxysilane. Of these polyfunctional monomers, di(meth)acrylic acid ester monomers are more preferable from a viewpoint of facilitating control of the degree of swelling in electrolyte solution of the particulate polymer A. One of these polyfunctional monomers may be used individually, or two or more of these polyfunctional monomers may be used in combination in a freely selected ratio.

The proportion constituted by the crosslinkable monomer unit in the polymer of the core portion is preferably 0.1 mass % or more, more preferably 0.2 mass % or more, and even more preferably 0.5 mass % or more, and is preferably 10 mass % or less, more preferably 5 mass % or less, and even more preferably 3 mass % or less from a viewpoint of controlling the degree of swelling of the particulate polymer A in electrolyte solution and improving wet adhesiveness of a battery member including a functional layer.

[Shell Portion]
—Glass-Transition Temperature—

The shell portion of the particulate polymer A is formed from a polymer having a specific glass-transition temperature. Specifically, the glass-transition temperature of the polymer of the shell portion is required to be not lower than −80° C. and not higher than 25° C., is preferably −70° C. or higher, and more preferably −60° C. or higher, and is preferably 10° C. or lower, more preferably 0° C. or lower, and even more preferably −10° C. or lower. Blocking resistance of a battery member including a functional layer decreases if the glass-transition temperature of the polymer of the shell portion is lower than −80° C. On the other hand, process adhesiveness of a battery member including a functional layer decreases if the glass-transition temperature of the polymer of the shell portion is higher than 25° C.

—Chemical Composition—

One or more monomers used to produce the polymer of the shell portion can be selected as appropriate such that the glass-transition temperature of the resultant polymer is within any of the ranges set forth above. Examples of monomers that can be used include the same monomers as provided as examples of monomers that can be used to produce the polymer of the core portion. One of such monomers may be used individually, or two or more of such monomers may be used in combination in a freely selected ratio.

Of these monomers, it is preferable to use a (meth)acrylic acid ester monomer as a monomer used in production of the polymer of the shell portion. In other words, the polymer of the shell portion preferably includes a (meth)acrylic acid ester monomer unit. The use of a (meth)acrylic acid ester monomer facilitates control of the glass-transition temperature of the polymer of the shell portion.

The proportion constituted by the (meth)acrylic acid ester monomer unit in the polymer of the shell portion is preferably 60 mass % or more, more preferably 70 mass % or more, even more preferably 80 mass % or more, and particularly preferably 90 mass % or more, and is preferably 100 mass % or less, more preferably 99.5 mass % or less, and even more preferably 99 mass % or less. When the proportion constituted by the (meth)acrylic acid ester monomer unit is kept within any of the ranges set forth above, it is easy to control the glass-transition temperature of the polymer of the shell portion to within a desired range. Moreover, wet adhesiveness of a battery member including a functional layer can be further improved.

The polymer of the shell portion may contain an acid group-containing monomer unit in addition to the (meth)acrylic acid ester monomer unit. Examples of acid group-containing monomers include monomers having an acid group such as carboxy group-containing monomers, sulfo group-containing monomers, phosphate group-containing monomers, and hydroxy group-containing monomers. Specific examples of acid group-containing monomers that may be used include the same monomers as for the acid group-containing monomer that may be included in the core portion.

Of these acid group-containing monomers, carboxy group-containing monomers are preferable, among which, monocarboxylic acids are more preferable, and (meth)acrylic acid is even more preferable.

One acid group-containing monomer may be used individually, or two or more acid group-containing monomers may be used in combination in a freely selected ratio.

The proportion constituted by the acid group-containing monomer unit in the polymer of the shell portion is preferably 0.1 mass % or more, more preferably 0.5 mass % or more, and even more preferably 1 mass % or more, and is preferably 15 mass % or less, more preferably 10 mass % or less, and even more preferably 5 mass % or less. By keeping the proportion constituted by the acid group-containing monomer unit within any of the ranges set forth above, dispersibility of the particulate polymer A in a functional layer can be improved, and the functional layer can be caused to display good adhesiveness (process adhesiveness and wet adhesiveness) over the entire surface thereof.

The polymer of the shell portion may include a crosslinkable monomer unit. Examples of crosslinkable monomers that can be used include the same monomers as provided as examples of crosslinkable monomers that can be used for the polymer of the core portion. Of these crosslinkable monomers, allyl methacrylate is preferable. One crosslinkable monomer may be used individually, or two or more crosslinkable monomers may be used in combination in a freely selected ratio.

The proportion constituted by the crosslinkable monomer unit in the polymer of the shell portion is preferably 0.05 mass % or more, more preferably 0.1 mass % or more, and even more preferably 0.2 mass % or more, and is preferably 4 mass % or less, more preferably 3 mass % or less, and even more preferably 2 mass % or less.

—Form—

Although no specific limitations are placed on the form of the shell portion, the shell portion is preferably formed by particles of a polymer. In a case in which the shell portion is formed by polymer particles, a plurality of the particles forming the shell portion may overlap in the radial direction of the particulate polymer A. However, it is preferable that the shell portion is formed by a single layer of the polymer particles in which the particles forming the shell portion do not overlap in the radial direction of the particulate polymer A.

<<Properties of Particulate Polymer A>>

The volume-average particle diameter of the particulate polymer A is preferably 200 nm or more, more preferably 350 nm or more, and even more preferably 500 nm or more, and is preferably 5 μm or less, more preferably 3 μm or less, and even more preferably 1 μm or less from a viewpoint of further improving process adhesiveness of a battery member including a functional layer.

Moreover, in a case in which the composition for a functional layer contains the subsequently described particulate polymer B having a glass-transition temperature of 80° C. or higher in addition to the particulate polymer A, the volume-average particle diameter of the particulate polymer A is preferably at least as large as the volume-average particle diameter of the particulate polymer B. When the volume-average particle diameter of the particulate polymer A is at least as large as the volume-average particle diameter of the particulate polymer B, the particulate polymer A can sufficiently contribute to improving process adhesiveness of a battery member including a functional layer.

The volume-average particle diameter of the particulate polymer A can be set within a desired range by, for example, adjusting the amount of emulsifier, the amounts of monomers, and so forth in production of the core portion and/or shell portion of the particulate polymer A.

The degree of swelling in electrolyte solution of the particulate polymer A is preferably 500 mass % or less, more preferably 400 mass % or less, and even more preferably 350 mass % or less. Although no specific limitations are placed on the lower limit of the degree of swelling in electrolyte solution of the particulate polymer A, the degree of swelling in electrolyte solution of the particulate polymer A is normally 100 mass % or more. When the degree of swelling in electrolyte solution of the particulate polymer A is within any of the ranges set forth above, the particulate polymer A swells to an appropriate degree in electrolyte solution, and wet adhesiveness of a battery member including a functional layer can be improved.

The "degree of swelling in electrolyte solution" referred to in the present disclosure can be measured using a measurement method described in the EXAMPLES section of the present specification.

The degree of swelling in electrolyte solution of the particulate polymer A can be set within a desired range by, for example, adjusting the types and/or amounts of monomers, or the like, used in production of the core portion and/or shell portion of the particulate polymer A.

<<Production Method of Particulate Polymer A>>

The particulate polymer A having the core-shell structure described above can be produced, for example, by stepwise polymerization in which the ratio of one or more monomers for the polymer of the core portion and one or more monomers for the polymer of the shell portion is changed over time. Specifically, the particulate polymer A can be produced by continuous, multi-step emulsion polymerization or multi-step suspension polymerization in which a polymer formed in a preceding step is then covered by a polymer formed in a succeeding step.

The following describes one example of a case in which the particulate polymer A having the core-shell structure described above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide or an azo compound such as 2,2'-azobis(2-methyl-N-(2-hydroxyethyl)-propionamide) or 2,2'-azobis(2-amidinopropane) hydrochloride, for example, may be used as a polymerization initiator.

The polymerization procedure involves initially mixing one or more monomers for forming the core portion and the emulsifier, and then performing emulsion polymerization as one batch to obtain a particulate polymer that forms the core portion. The particulate polymer A having the core-shell structure described above can then be obtained by performing polymerization of one or more monomers for forming the shell portion in the presence of the particulate polymer forming the core portion.

In this polymerization, it is preferable that the monomers for forming the polymer of the shell portion are supplied into the polymerization system continuously or divided into a plurality of portions from a viewpoint of partially covering the outer surface of the core portion with the shell portion. As a result of the monomers for forming the polymer of the shell portion being supplied into the polymerization system in portions or continuously, the polymer forming the shell portion can be formed as particles that bond to the core portion such as to form the shell portion partially covering the core portion.

<Particulate Polymer B>

The presently disclosed composition for a functional layer preferably contains a particulate polymer B having a glass-transition temperature of 80° C. or higher in addition to the particulate polymer A set forth above. The particulate polymer B having a comparatively high glass-transition temperature as described above can favorably maintain its shape during the production process of a secondary battery. Consequently, blocking resistance of a battery member including a functional layer can be improved by forming the functional layer using a composition for a functional layer containing the particulate polymer B.

<<Properties of Particulate Polymer B>>

The glass-transition temperature of the particulate polymer B is required to be 80° C. or higher, is preferably 90° C. or higher, and is more preferably 95° C. or higher from a viewpoint of improving blocking resistance of a battery member including a functional layer. Although no specific limitations are placed on the upper limit of the glass-transition temperature of the particulate polymer B, the glass-transition temperature of the particulate polymer B is preferably 500° C. or lower.

The volume-average particle diameter of the particulate polymer B is preferably smaller than the volume-average particle diameter of the particulate polymer A as previously described. For example, the volume-average particle diameter of the particulate polymer B is preferably 50 nm or more, more preferably 100 nm or more, and even more preferably 200 nm or more, and is preferably 500 nm or less, more preferably 400 nm or less, and even more preferably 350 nm or less from a viewpoint of further improving blocking resistance of a battery member including a functional layer.

<<Chemical Composition of Particulate Polymer B>>

No specific limitations are placed on the chemical composition of the particulate polymer B so long as the glass-transition temperature thereof is 80° C. or higher. The particulate polymer B may, for example, be an aromatic vinyl polymer such as polystyrene, polydivinylbenzene, or crosslinked styrene-divinylbenzene copolymer; polyethylene; polyimide; polyamide; polyamide-imide; melamine resin; phenolic resin; benzoguanamine-formaldehyde condensate; polysulfone; polyacrylonitrile; polyaramid; or polyacetal. One of these polymers may be used individually, or two or more of these polymers may be used in combination in a freely selected ratio. Of these polymers, an aromatic vinyl polymer is preferable.

The aromatic vinyl polymer is a polymer including an aromatic vinyl monomer unit. Examples of aromatic vinyl monomers that can be used to form the aromatic vinyl monomer unit include styrene, α-methylstyrene, vinyltoluene, and divinyl benzene. One of these aromatic vinyl monomers may be used individually, or two or more of these aromatic vinyl monomers may be used in combination in a freely selected ratio. Of these aromatic vinyl monomers, styrene is preferable.

The proportion constituted by the aromatic vinyl monomer unit in the particulate polymer B is preferably 70 mass % or more, more preferably 80 mass % or more, even more preferably 90 mass % or more, particularly preferably 95 mass % or more, and most preferably 100 mass %.

The aromatic vinyl polymer may include monomer units other than the aromatic vinyl monomer unit. Examples of monomers that can be used to form such other monomer units include the monomers provided as examples of monomers that can be used in production of the polymer of the core portion of the particulate polymer A (excluding those that correspond to aromatic vinyl monomers). One of such monomers may be used individually, or two or more of such monomers may be used in combination in a freely selected ratio.

<<Production Method of Particulate Polymer B>>

No specific limitations are placed on the mode of polymerization of the particulate polymer B. For example, any method among solution polymerization, suspension polymerization, bulk polymerization, and emulsion polymerization may be used. Moreover, the polymerization reaction may be addition polymerization such as ionic polymerization, radical polymerization, or living radical polymerization. The polymerization may be carried out with a commonly used emulsifier, dispersant, polymerization initiator, chain transfer agent, or the like that are usable for polymerization, and the amount thereof may also be the same as commonly used.

<<Ratio of Amounts of Particulate Polymer A and Particulate Polymer B>>

In a case in which the composition for a functional layer contains the particulate polymer B in addition to the particulate polymer A, no specific limitations are placed on the ratio of amounts of these polymers. For example, the proportion constituted by the particulate polymer A among the total of the particulate polymer A and the particulate polymer B is preferably 5 mass % or more, more preferably 10 mass % or more, even more preferably 20 mass % or more, and particularly preferably 25 mass % or more, and is preferably 95 mass % or less, more preferably 90 mass % or less, even more preferably 70 mass % or less, and particularly preferably 55 mass % or less. Wet adhesiveness of a battery member including a functional layer can be increased and process adhesiveness of the battery member can be further improved when the proportion constituted by the particulate polymer A among the total of the particulate polymer A and the particulate polymer B is 5 mass % or more. On the other hand, blocking resistance of a battery member including a functional layer can be further improved when the proportion constituted by the particulate polymer A among the total of the particulate polymer A and the particulate polymer B is 95 mass % or less.

<Other Components>

No specific limitations are placed on components other than the particulate polymer A and the particulate polymer B that may be contained in the presently disclosed composition for a functional layer. Examples of such components include known functional layer binders (for example, polymers having a glass-transition temperature of lower than 80° C.) and known additives. Examples of known additives that may be used include, but are not specifically limited to, components such as surface tension modifiers, dispersants, viscosity modifiers, reinforcing materials, and additives for electrolyte solution. These other components are not specifically limited so long as they do not affect the battery reactions and may be selected from commonly known components such as those described in WO 2012/115096 A1. One of these components may be used individually, or two or more of these components may be used in combination in a freely selected ratio.

<Production Method of Composition for Non-Aqueous Secondary Battery Functional Layer>

The presently disclosed composition for a non-aqueous secondary battery functional layer can be produced by, for example, stirring and mixing the particulate polymer A and the optionally added particulate polymer B and other components set forth above in the presence of a dispersion medium such as water. However, no specific limitations are made so long as the particulate polymer A having the specific core-shell structure set forth above is contained in the presently disclosed composition for a non-aqueous secondary battery functional layer. In a case in which a dispersion liquid of a particulate polymer is used in production of the composition for a functional layer, liquid content in the dispersion liquid may be used as the dispersion medium of the composition for a functional layer.

Known methods may be adopted as the stirring method without any specific limitations. Specifically, the composition for a functional layer can be produced in slurry-form by mixing the aforementioned components and dispersion medium using a typical stirring vessel, ball mill, sand mill, bead mill, pigment disperser, ultrasonic disperser, grinding machine, homogenizer, planetary mixer, FILMIX, or the like. Mixing of the components and the dispersion medium may normally be performed for a period of from 10 minutes to several hours in a temperature range of from room temperature to 80° C.

(Functional Layer for Non-Aqueous Secondary Battery)

The presently disclosed functional layer for a non-aqueous secondary battery is a layer that is formed from the composition for a non-aqueous secondary battery functional layer set forth above. The presently disclosed functional layer for a non-aqueous secondary battery can be formed, for example, by applying the above-described composition for a functional layer onto the surface of a suitable substrate to form an applied film, and then drying the applied film that is formed. In other words, the presently disclosed functional layer is formed from a dried product of the composition for a functional layer set forth above and contains the particulate polymer A and the optional particulate polymer B and other components. Note that in a case in which a polymer such as the particulate polymer A includes a crosslinkable monomer unit, the polymer including the crosslinkable monomer unit may be crosslinked during drying of the composition for a functional layer or may be crosslinked in heat treatment or the like that is optionally performed after drying (i.e., the presently disclosed functional layer may contain a crosslinked product of a polymer such as the particulate polymer A).

The presently disclosed functional layer can cause a battery member including the functional layer to display excellent blocking resistance and process adhesiveness as a result of the functional layer being formed using the composition for a functional layer set forth above.

Note that although particulate polymers such as the particulate polymer A and the particulate polymer B are present in a particulate form in the composition for a functional layer, these polymers may be present in a particulate form or in any other form in the functional layer that is formed.

<Substrate>

No limitations are placed on the substrate on which the composition for a functional layer is applied. For example, an applied film of the composition for a functional layer may be formed on the surface of a detachable substrate, the applied film may be dried to form a functional layer, and then the detachable substrate may be peeled from the functional layer. The functional layer that is peeled from the detachable substrate in this manner can be used as a free-standing film in formation of a battery member of a secondary battery. Specifically, the functional layer that is peeled from the detachable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery member production efficiency since a step of peeling the functional layer can be omitted. The functional layer provided on the separator substrate or electrode substrate can suitably be used, in particular, as an adhesive layer for adhesion of battery members such as a separator and an electrode.

[Separator Substrate]

The separator substrate is not specifically limited and may be a known separator substrate such as an organic separator substrate. The organic separator substrate is a porous member that is made from an organic material.

The organic separator substrate may, for example, be a microporous membrane or non-woven fabric containing a polyolefin resin such as polyethylene or polypropylene, an aromatic polyamide resin, or the like, and is preferably a microporous membrane or non-woven fabric made from polyethylene due to the excellent strength thereof. The separator substrate may be of any thickness but is preferably not less than 5 µm and not more than 30 µm in thickness, more preferably not less than 5 µm and not more than 20 µm in thickness, and even more preferably not less than 5 µm and not more than 18 µm in thickness. A separator substrate thickness of 5 µm or more provides adequate safety. Moreover, a separator substrate thickness of 30 µm or less can inhibit reduction of ion conductivity, inhibit deterioration of secondary battery output characteristics, inhibit increase of heat contraction force of the separator substrate, and increase heat resistance.

[Electrode Substrate]

The electrode substrate (positive/negative electrode substrate) is not specifically limited and may, for example, be an electrode substrate obtained by forming an electrode mixed material layer on a current collector.

The current collector, an electrode active material (positive/negative electrode active material) and an electrode mixed material layer binder (positive/negative electrode mixed material layer binder) in the electrode mixed material layer, and the method by which the electrode mixed material layer is formed on the current collector may be known examples thereof such as those described in JP 2013-145763 A, for example.

<Formation Method of Functional Layer for Non-Aqueous Secondary Battery>

Examples of methods by which the functional layer may be formed on a substrate such as the separator substrate or the electrode substrate set forth above include:

(1) a method in which the presently disclosed composition for a functional layer is applied onto a surface of a separator substrate or electrode substrate (surface at the electrode mixed material layer side in the case of an electrode substrate; same applies below) and is then dried;

(2) a method in which a separator substrate or electrode substrate is immersed in the presently disclosed composition for a functional layer and is then dried; and (3) a method in which the presently disclosed composition for a functional layer is applied onto a detachable substrate and is dried to produce a functional layer that is then transferred onto the surface of a separator substrate or electrode substrate.

Of these methods, method (1) is particularly preferable since it allows simple control of the thickness of the functional layer. More specifically, method (1) includes a step of applying the composition for a functional layer onto a substrate (application step) and a step of drying the composition for a functional layer that has been applied onto the substrate to form a functional layer (functional layer formation step).

Note that the functional layer may be formed at one side or both sides of a separator substrate or electrode substrate depending on the structure of the secondary battery that is to be produced. For example, in a case in which a separator substrate is used as the substrate, the functional layer is preferably formed at both sides of the separator substrate, whereas in a case in which an electrode substrate is used as the substrate, the functional layer is preferably formed at one side of the electrode substrate (particularly on the electrode mixed material layer of the electrode substrate).

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Functional Layer Formation Step]

The method by which the composition for a functional layer on the substrate is dried in the functional layer formation step is not specifically limited and may be a commonly known method. For example, drying methods such as drying through warm air, hot air, or low-humidity air, vacuum drying, and drying through irradiation with infrared light, an electron beam, or the like may be adopted. Although no specific limitations are placed on the drying conditions, the drying temperature is preferably 40° C. to 150° C., and the drying time is preferably 2 minutes to 30 minutes.

<Thickness of Functional Layer>

The thickness of each functional layer formed on the substrate is preferably 0.01 µm or more, more preferably 0.1 µm or more, and even more preferably 0.5 µm or more, and is preferably 10 µm or less, more preferably 5 µm or less, and even more preferably 2 µm or less. A functional layer thickness of 0.01 µm or more can ensure sufficient functional layer strength. On the other hand, a functional layer thickness of 10 µm or less can ensure ion conductivity of the functional layer in a secondary battery and improve battery characteristics (output characteristics, etc.) of the secondary battery including the functional layer.

<Battery Member Including Functional Layer>

A battery member (separator or electrode) including the presently disclosed functional layer may include elements other than the presently disclosed functional layer set forth above in addition to the separator substrate or electrode substrate and the presently disclosed functional layer so long as the effects disclosed herein are not significantly lost.

(Non-Aqueous Secondary Battery)

The presently disclosed non-aqueous secondary battery includes the presently disclosed functional layer for a non-aqueous secondary battery set forth above. More specifically, the presently disclosed non-aqueous secondary battery includes a positive electrode, a negative electrode, a separator, and an electrolyte solution, wherein at least one battery member among the positive electrode, the negative electrode, and the separator includes the functional layer for a non-aqueous secondary battery set forth above.

<Positive Electrode, Negative Electrode, and Separator>

At least one of the positive electrode, the negative electrode, and the separator used in the presently disclosed secondary battery includes the presently disclosed functional layer. Specifically, an electrode that has the presently disclosed functional layer formed on an electrode substrate including an electrode mixed material layer formed on a current collector may be used as a positive or negative electrode that includes a functional layer. Moreover, a separator that has the presently disclosed functional layer on a separator substrate may be used as a separator that includes a functional layer. The electrode substrate and the separator substrate can be any of the examples previously described in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of suitable organic solvents in a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed non-aqueous secondary battery set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. At least one battery member among the positive electrode, the negative electrode, and the separator is a battery member that includes a functional layer. An expanded metal, an overcurrent prevention element such as a fuse or a PTC element, a lead plate, or the like may be placed in the battery container as required in order to prevent pressure from increasing inside the battery container and prevent overcharging or overdischarging from occurring. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the case of a polymer that is produced through copolymerization of a plurality of types of monomers, the proportion of a monomer unit in the polymer that is formed through polymerization of a given monomer is normally, unless otherwise specified, the same as the ratio (charging ratio) of the given monomer among all monomers used in polymerization of the polymer.

Moreover, in the case of a particulate polymer having a core-shell structure, the proportion constituted by the core portion (core portion proportion) among the total of the core portion and the shell portion is, unless otherwise specified, the same as the ratio (charging ratio) of the mass of monomer used in production of a polymer of the core portion among the total of this mass and the mass of monomer used in production of a polymer of the shell portion.

In the examples and comparative examples, the following methods were used to measure and evaluate the glass-transition temperature of polymers of a core portion and a shell portion of a particulate polymer A, a particulate polymer B, and a functional layer binder, the degree of swelling in electrolyte solution of a particulate polymer A, the volume-average particle diameter of particulate polymers A and B, and the process adhesiveness, blocking resistance, and wet adhesiveness of a battery member including a functional layer.

<Glass-Transition Temperature (Tg)>

Monomers, various additives, and so forth used in formation of a core portion and a shell portion of a particulate polymer A were used to prepare water dispersions each containing a measurement sample polymer (polymer of core portion or polymer of shell portion) under the same polymerization conditions as for the core portion and the shell portion. The prepared water dispersions were used as measurement samples. In addition, a water dispersion containing a particulate polymer B and a water dispersion containing a functional layer binder were prepared as measurement samples.

For each of the measurement samples, 10 mg of the sample was weighed into an aluminum pan and then measurement was performed under conditions prescribed in JIS Z 8703 using a differential scanning calorimeter (EXSTAR DSC6220 produced by SIT NanoTechnology Inc.) with a measurement temperature range of −100° C. to 500° C. and a heating rate of 10° C./min to obtain a differential scanning calorimetry (DSC) curve. An empty aluminum pan was used as a reference. The glass-transition temperature (° C.) was determined as a point at which the baseline immediately before appearance of a heat absorption peak in the DSC curve where the differential signal (DDSC) reaches 0.05 mW/min/mg or higher intersects with a tangent to the DSC curve at an inflection point that appears first after the heat absorption peak during this heating process.

<Degree of Swelling in Electrolyte Solution>

A water dispersion containing a particulate polymer A was placed in a petri dish made of polytetrafluoroethylene. The water dispersion in the petri dish was dried for 48 hours at a temperature of 25° C. to obtain a powdered sample. Approximately 0.2 g of the sample was pressed for 2 minutes at a temperature of 200° C. and a pressure of 5 MPa to obtain a specimen. The weight of the obtained specimen was measured and was taken to be W0.

Next, the specimen was immersed in electrolyte solution having a temperature of 60° C. for 72 hours. The electrolyte solution was a solution containing $LiPF_6$ with a concentration of 1 M as a supporting electrolyte in a mixed solvent of ethylene carbonate (EC) and diethyl carbonate (DEC) (volume mixing ratio: EC/DEC=1/2; SP value: 12.8 $(cal/cm^3)^{1/2}$).

After immersion, the specimen was removed from the electrolyte solution and electrolyte solution on the surface of the specimen was wiped off. The weight of the post-immersion specimen was measured and was taken to be W1. The measured values of W0 and W1 were used to calculate the degree of swelling in electrolyte solution S (mass %) as S=W1/W0×100.

<Volume-Average Particle Diameter>

The volume-average particle diameters of a particulate polymer A and a particulate polymer B were measured by laser diffraction. Specifically, a water dispersion containing a prepared particulate polymer (adjusted to a solid content concentration of 0.1 mass %) was used as a sample. In a particle diameter distribution (volume basis) measured using a laser diffraction particle size analyzer (produced by Beckman Coulter, Inc.; product name: LS-230), a particle diameter (D50) at which cumulative volume calculated from a small diameter end of the distribution reached 50% was determined as the volume-average particle diameter.

<Process Adhesiveness>

A produced positive electrode and separator (including a functional layer at both sides) were each cut to 50 mm in length and 10 mm in width.

The cut positive electrode and separator were stacked on one another. The resultant laminate was pressed at a pressing speed of 30 m/min using a roll press with a temperature of 25° C. and a load of 10 kN/m to obtain a specimen.

The specimen was placed with the surface at the current collector side of the positive electrode facing downward, and cellophane tape (tape prescribed by JIS Z1522) was attached to the surface of the positive electrode. The cellophane tape had been affixed to a horizontal test stage. The stress at the time when the separator was peeled by pulling up one end in the vertical direction at a pulling speed of 50 mm/min was then measured. This measurement was made a total of three times.

In addition, a produced negative electrode and separator were each cut to 50 mm in length and 10 mm in width. A specimen was obtained and stress was measured three times in the same way as when the positive electrode was used.

An average value of the six measurements of stress obtained using the positive electrode and the negative electrode was determined as first peel strength (N/m) and was evaluated as process adhesiveness of an electrode and a separator via a functional layer by the following standard. A larger first peel strength indicates better process adhesiveness.

A: First peel strength of 3.0 N/m or more
B: First peel strength of not less than 1.0 N/m and less than 3.0 N/m
C: First peel strength of not less than 0.5 N/m and less than 1.0 N/m
D: First peel strength of less than 0.5 N/m <Blocking Resistance>

A produced separator (including a functional layer at both sides) was cut to obtain 5 cm×5 cm and 4 cm×4 cm square pieces. The cut 5 cm square piece and 4 cm square piece were stacked on one another and the resultant laminate was placed under 10 g/cm² of pressure at 40° C. to obtain a pressed specimen. The obtained pressed specimen was left for 24 hours. Thereafter, one of the stacked separator square pieces was secured and the other separator square piece was pulled with a force of 5 N/m to observe whether peeling was possible, and this was evaluated by the following standard.

A: Blocking of separators does not occur
B: Blocking of separators occurs but separators can be peeled apart
C: Blocking of separators occurs and separators cannot be peeled apart <Wet Adhesiveness>

A laminate of a positive electrode and a separator (including a functional layer at both sides) was obtained and the laminate was pressed to obtain a specimen in the same way as in evaluation of process adhesiveness.

The specimen was immersed in an electrolyte solution having a temperature of 60° C. for 72 hours. The electrolyte solution was a solution containing $LiPF_6$ with a concentration of 1 M as a supporting electrolyte in a mixed solvent of ethylene carbonate (EC) and diethyl carbonate (DEC) (volume mixing ratio: EC/DEC=1/2; SP value: 12.8 $(cal/cm^3)^{1/2}$).

After immersion, the specimen was removed from the electrolyte solution and electrolyte solution on the surface of the specimen was wiped off. The specimen was pressed again for 3 minutes under conditions of 1 MPa and 80° C. The specimen that had been pressed again was placed with the surface at the current collector side of the positive electrode facing downward, and cellophane tape (tape prescribed by JIS Z1522) was attached to the surface of the positive electrode. The cellophane tape had been affixed to a horizontal test stage. The stress at the time when the separator was peeled by pulling up one end in the vertical direction at a pulling speed of 50 mm/min was then measured. This measurement was made a total of three times.

In addition, a laminate of a negative electrode and a separator was obtained and the laminate was pressed to obtain a specimen in the same way as in evaluation of process adhesiveness. A specimen that had been pressed again was obtained and the post-electrolyte solution immersion stress was measured three times in the same way as when the positive electrode was used.

An average value of the six measurements of stress obtained using the positive electrode and the negative electrode was determined as second peel strength (N/m) and was evaluated as wet adhesiveness of an electrode and a separator via a functional layer, after immersion in electrolyte solution, by the following standard. A larger second peel strength indicates better wet adhesiveness.

A: Second peel strength of 5.0 N/m or more
B: Second peel strength of less than 5.0 N/m Example 1

<Production of Particulate Polymer A>

A 5 MPa pressure vessel equipped with a stirrer was charged with 70 parts of a monomer mixture for core portion formation containing: 39.0% of acrylonitrile as a (meth) acrylonitrile monomer; 20.0% of methyl methacrylate and 38.0% of butyl acrylate as (meth)acrylic acid ester monomers; 2.0% of methacrylic acid as an acid group-containing monomer; and 1.0% of ethylene glycol dimethacrylate as a crosslinkable monomer, 1 part of sodium dodecylbenzenesulfonate as an emulsifier, 150 parts of deionized water, and 0.5 parts of potassium persulfate as a polymerization initiator. These materials were sufficiently stirred and were then heated to 60° C. to initiate polymerization. Polymerization was continued until the polymerization conversion rate reached 96% to yield a water dispersion containing a particulate polymer forming a core portion.

Next, 30 parts of a monomer mixture for shell portion formation containing 97.7% of butyl acrylate as a (meth) acrylic acid ester monomer, 2.0% of methacrylic acid as an acid group-containing monomer, and 0.3% of allyl methacrylate as a crosslinkable monomer was continuously added to the water dispersion and was heated to 70° C. therewith to continue polymerization. The reaction was terminated by cooling at the point at which the polymerization conversion rate reached 96% to yield a water dispersion containing a particulate polymer A having a core-shell structure in which a shell portion partially covered the outer surface of a core portion.

The volume-average particle diameter and degree of swelling in electrolyte solution of the obtained particulate polymer A were measured. The glass-transition temperatures of polymers of the core portion and the shell portion were also measured. The results are shown in Table 2.

<Production of Particulate Polymer B>

A 5 MPa pressure vessel equipped with a stirrer was charged with 100 parts of styrene as an aromatic vinyl monomer, 1 part of sodium dodecylbenzenesulfonate as an emulsifier, 150 parts of deionized water, and 0.5 parts of potassium persulfate as a polymerization initiator to obtain a mixture. The mixture was sufficiently stirred and was then heated to 60° C. to initiate polymerization. Cooling was performed at the point at which the polymerization conversion rate reached 96% to yield a water dispersion of polystyrene (aromatic vinyl polymer) as a particulate polymer B.

The glass-transition temperature and volume-average particle diameter of the obtained particulate polymer B were measured. The results are shown in Table 2.

<Production of Functional Layer Binder>

A reactor equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate. The gas phase was purged with nitrogen gas and heating was performed to 60° C.

A monomer mixture was obtained in a separate vessel by mixing 50 parts of deionized water, 0.5 parts of sodium dodecylbenzenesulfonate as an emulsifier, and 94 parts of butyl acrylate, 2 parts of acrylonitrile, 2 parts of methacrylic acid, 1 part of N-hydroxymethylacrylamide, and 1 part of allyl glycidyl ether as monomers. The monomer mixture was continuously added to the reactor over 4 hours to perform polymerization. The reaction was carried out at 60° C. during the addition. Once the addition was completed, stirring was carried out for a further 3 hours at 70° C. to complete the reaction and yield a water dispersion containing an acrylic polymer as a functional layer binder.

The glass-transition temperature of the obtained functional layer binder was measured to be −30° C.

<Production of Composition for Functional Layer>

Premixing of 50 parts in terms of solid content of the particulate polymer A and 50 parts in terms of solid content of the particulate polymer B was performed in a stirring vessel. A mixture was then obtained by adding 10 parts in terms of solid content of the functional layer binder to the resultant premixture.

In addition, 1 part in terms of solid content of a surface tension modifier (ethylene oxide-propylene oxide copolymer) was added to the obtained mixture. The mixture was diluted using deionized water to obtain a composition for a functional layer (solid content concentration: 30%) in the form of a slurry.

<Production of Separator Including Functional Layer at Both Sides>

A separator substrate made from polypropylene (produced by Celgard, LLC., product name: Celgard 2500) was prepared. The composition for a functional layer obtained as described above was applied onto the surface of the prepared separator substrate and was dried for 3 minutes at a temperature of 50° C. The other side of the separator substrate was subjected to the same operation to obtain a separator including a functional layer at both sides thereof (thickness of each functional layer: 1 μm).

The process adhesiveness, blocking resistance, and wet adhesiveness of the obtained separator were evaluated. Note that a negative electrode and a positive electrode produced as described below were used in evaluation of the process adhesiveness and wet adhesiveness. The results are shown in Table 2.

<Production of Negative Electrode>

A 5 MPa pressure vessel including a stirrer was charged with 33 parts of 1,3-butadiene, 3.5 parts of itaconic acid, and 63.5 parts of styrene as monomers, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The polymerization reaction was terminated by cooling at the point at which the polymerization conversion rate reached 96% to yield a mixture containing a particulate binder (styrene-butadiene copolymer). The mixture was adjusted to pH 8 through addition of 5% sodium hydroxide aqueous solution, and unreacted monomer was then removed by thermal-vacuum distillation. Thereafter, the mixture was cooled to 30° C. or lower to obtain a water dispersion containing a negative electrode binder.

A mixture containing 100 parts of artificial graphite (average particle diameter: 15.6 μm) and 1 part in terms of solid content of a 2% aqueous solution of a sodium salt of carboxymethyl cellulose (produced by Nippon Paper Industries Co., Ltd.; product name: MAC350HC) as a thickener was adjusted to a solid content concentration of 68% with deionized water and was then mixed for 60 minutes at 25° C. The solid content concentration was further adjusted to 62% with deionized water and then a further 15 minutes of mixing was carried out at 25° C. to yield a mixed liquid. Next, 1.5 parts in terms of solid content of the previously described water dispersion containing the negative electrode binder and deionized water were added to the obtained mixed liquid, the final solid content concentration was adjusted to 52%, and a further 10 minutes of mixing was carried out. The resultant mixed liquid was subjected to a defoaming process under reduced pressure to yield a slurry composition for a negative electrode having good fluidity.

A comma coater was used to apply the slurry composition for a negative electrode obtained as described above onto one side of copper foil (thickness: 20 µm) used as a current collector such that the thickness thereof after drying was approximately 150 µm. The applied slurry composition was dried by conveying the copper foil onto which the slurry composition had been applied inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode (negative electrode mixed material layer thickness: 80 µm).

<Production of Positive Electrode>

A mixed liquid adjusted to a total solid content concentration of 70% was obtained by mixing 100 parts of $LiCoO_2$ (volume-average particle diameter: 12 µm) as a positive electrode active material, 2 parts of acetylene black (produced by Denki Kagaku Kogyo Kabushiki Kaisha; product name: HS-100) as a conductive material, and 2 parts in terms of solid content of polyvinylidene fluoride (produced by Kureha Corporation; product name: #7208) as a positive electrode binder with N-methylpyrrolidone as a solvent. The obtained mixed liquid was mixed using a planetary mixer to obtain a slurry composition for a positive electrode.

A comma coater was used to apply the slurry composition for a positive electrode obtained as described above onto one side of aluminum foil (thickness: 20 µm) used as a current collector such that the thickness thereof after drying was approximately 150 µm. The applied slurry composition was dried by conveying the aluminum foil inside a 60° C. oven for 2 minutes at a speed of 0.5 m/min. Thereafter, heat treatment was performed for 2 minutes at 120° C. to obtain a pre-pressing positive electrode web. The pre-pressing positive electrode web was rolled by roll pressing to obtain a post-pressing positive electrode (positive electrode mixed material layer thickness: 80 µm).

<Production of Non-Aqueous Secondary Battery>

The post-pressing positive electrode obtained as described above was cut out as a 4 cm×4 cm square. The separator (including a functional layer at both sides) obtained as described above was cut out to 5 cm×5 cm and was positioned on the surface of the positive electrode mixed material layer of the positive electrode. In addition, the post-pressing negative electrode produced as described above was cut out to 4.2 cm×4.2 cm and was positioned on the surface of the separator that was not in contact with the positive electrode mixed material layer such that the surface of the negative electrode mixed material layer faced the separator to obtain a laminate. Next, the obtained laminate was pressed at a temperature of 60° C. and a pressure of 0.5 MPa to obtain a laminate in which the positive electrode, separator, and negative electrode were adhered via functional layers.

The laminate that had been adhered was then enclosed in an aluminum packing case serving as a battery case, and electrolyte solution was injected such that no air remained. The electrolyte solution was a solution containing $LiPF_6$ with a concentration of 1 M as a supporting electrolyte in a mixed solvent of ethylene carbonate (EC) and diethyl carbonate (DEC) (volume mixing ratio: EC/DEC=1/2; SP value: 12.8 $(cal/cm^3)^{1/2}$). The opening of the aluminum packing case was then heat sealed at 150° C., hermetically sealing the aluminum packing case. Finally, the aluminum packing case portion containing the adhered laminate was pressed at 60° C. and 0.5 MPa to produce a lithium ion secondary battery that was a 40 mAh stacked laminate cell. Good operation of the produced lithium ion secondary battery was confirmed.

Examples 2 and 3

A particulate polymer A, a particulate polymer B, a functional layer binder, a composition for a functional layer, a separator, a negative electrode, a positive electrode, and a secondary battery were produced in the same way as in Example 1 with the exception that the types and proportions of monomers used for shell portion formation in production of the particulate polymer A were changed as indicated in Table 1. The obtained particulate polymer A had a core-shell structure in which a shell portion partially covered the outer surface of a core portion. Measurements and evaluations were performed in the same way as in Example 1. The results are shown in Table 2.

Examples 4 to 6

A particulate polymer A, a particulate polymer B, a functional layer binder, a composition for a functional layer, a separator, a negative electrode, a positive electrode, and a secondary battery were produced in the same way as in Example 1 with the exception that the proportions of monomers used for core portion formation in production of the particulate polymer A were changed as indicated in Table 1. The obtained particulate polymer A had a core-shell structure in which a shell portion partially covered the outer surface of a core portion. Measurements and evaluations were performed in the same way as in Example 1. The results are shown in Table 2.

Example 7

A particulate polymer A, a particulate polymer B, a functional layer binder, a composition for a functional layer, a separator, a negative electrode, a positive electrode, and a secondary battery were produced in the same way as in Example 1 with the exception that in production of the particulate polymer A, the amount of the monomer mixture for core portion formation was changed to 50 parts and the amount of the monomer mixture for shell portion formation was changed to 50 parts (i.e., the proportion constituted by the core portion among the total of the core portion and the shell portion was changed to 50%). The obtained particulate polymer A had a core-shell structure in which a shell portion partially covered the outer surface of a core portion. Measurements and evaluations were performed in the same way as in Example 1. The results are shown in Table 2.

Examples 8 and 9

A particulate polymer A, a particulate polymer B, a functional layer binder, a composition for a functional layer, a separator, a negative electrode, a positive electrode, and a secondary battery were produced in the same way as in Example 1 with the exception that in production of the particulate polymer A, the amount of sodium dodecylbenzenesulfonate used as an emulsifier was changed to 1.3 parts or 1.5 parts to adjust the volume-average particle diameter of the particulate polymer A. The obtained particulate polymer A had a core-shell structure in which a shell portion partially covered the outer surface of a core portion. Measurements and evaluations were performed in the same way as in Example 1. The results are shown in Table 2.

Example 10

A particulate polymer A, a particulate polymer B, a functional layer binder, a composition for a functional layer, a separator, a negative electrode, a positive electrode, and a secondary battery were produced in the same way as in Example 1 with the exception that in production of the particulate polymer B, the amount of styrene used as an aromatic vinyl monomer was changed to 94 parts and 6 parts of butyl acrylate was additionally used as a (meth)acrylic acid ester monomer. Measurements and evaluations were performed in the same way as in Example 1. The results are shown in Table 2.

Examples 11 to 14

A particulate polymer A, a particulate polymer B, a functional layer binder, a composition for a functional layer, a separator, a negative electrode, a positive electrode, and a secondary battery were produced in the same way as in Example 1 with the exception that the amounts of the particulate polymer A and the particulate polymer B used in production of the composition for a functional layer (i.e., the proportion constituted by the particulate polymer A among the total of the particulate polymer A and the particulate polymer B) were changed as indicated in Table 2. Measurements and evaluations were performed in the same way as in Example 1. The results are shown in Table 2.

Example 15

A particulate polymer A, a particulate polymer B, a functional layer binder, a composition for a functional layer, a separator, a negative electrode, a positive electrode, and a secondary battery were produced in the same way as in Example 1 with the exception that the types and proportions of monomers used for core portion formation and for shell portion formation in production of the particulate polymer A were changed as indicated in Table 1. The obtained particulate polymer A had a core-shell structure in which a shell portion partially covered the outer surface of a core portion. Measurements and evaluations were performed in the same way as in Example 1. The results are shown in Table 2.

Example 16

A particulate polymer A, a particulate polymer B, a functional layer binder, a composition for a functional layer, a separator, a negative electrode, a positive electrode, and a secondary battery were produced in the same way as in Example 1 with the exception that in production of the particulate polymer B, the amount of sodium dodecylbenzenesulfonate used as an emulsifier was changed to 0.7 parts to adjust the volume-average particle diameter of the particulate polymer B. Measurements and evaluations were performed in the same way as in Example 1. The results are shown in Table 2.

Example 17

A particulate polymer A, a particulate polymer B, a composition for a functional layer, a separator, a negative electrode, a positive electrode, and a secondary battery were produced in the same way as in Example 1 with the exception that a functional layer binder was not used in production of the composition for a functional layer. Measurements and evaluations were performed in the same way as in Example 1. The results are shown in Table 2.

Comparative Example 1

A particulate polymer was produced in the same way as in the production method of the particulate polymer A in Example 1 with the exception that the types and proportions of monomers used for shell portion formation were changed as indicated in Table 1. The obtained particulate polymer had a core-shell structure in which a shell portion partially covered the outer surface of a core portion. A particulate polymer B, a functional layer binder, a composition for a functional layer, a separator, a negative electrode, a positive electrode, and a secondary battery were produced in the same way as in Example 1 with the exception that this particulate polymer was used instead of the particulate polymer A. Measurements and evaluations were performed in the same way as in Example 1. The results are shown in Table 2.

Comparative Example 2

A particulate polymer B, a functional layer binder, a composition for a functional layer, a separator, a negative electrode, a positive electrode, and a secondary battery were produced in the same way as in Example 1 with the exception that a particulate polymer obtained as described below that did not have a core-shell structure (non-core-shell structure particulate polymer) was used instead of the particulate polymer A. Measurements and evaluations were performed in the same way as in Example 1. The results are shown in Table 2.

<Production of Non-Core-Shell Structure Particulate Polymer>

A 5 MPa pressure vessel equipped with a stirrer was charged with 39.0 parts of acrylonitrile as a (meth)acrylonitrile monomer, 27.0 parts of methyl methacrylate and 31.0 parts of butyl acrylate as (meth)acrylic acid ester monomers, 2.0 parts of methacrylic acid as an acid group-containing monomer, 1.0 parts of ethylene glycol dimethacrylate as a crosslinkable monomer, 1 part of sodium dodecylbenzenesulfonate as an emulsifier, 150 parts of deionized water, and 0.5 parts of potassium persulfate as a polymerization initiator.

These materials were sufficiently stirred and were then heated to 60° C. to initiate polymerization. Polymerization was continued until the polymerization conversion rate reached 96% to yield a water dispersion containing a non-core-shell structure particulate polymer.

Comparative Example 3

A particulate polymer B, a functional layer binder, a composition for a functional layer, a separator, a negative electrode, a positive electrode, and a secondary battery were produced in the same way as in Example 1 with the exception that a non-core-shell structure particulate polymer obtained as described below was used instead of the particulate polymer A. Measurements and evaluations were performed in the same way as in Example 1. The results are shown in Table 2.

<Production of Non-Core-Shell Structure Particulate Polymer>

A 5 MPa pressure vessel equipped with a stirrer was charged with 97.7 parts of butyl methacrylate as a (meth)acrylic acid ester monomer, 2.0 parts of methacrylic acid as an acid group-containing monomer, 0.3 parts of allyl methacrylate as a crosslinkable monomer, 1 part of sodium dodecylbenzenesulfonate as an emulsifier, 150 parts of deionized water, and 0.5 parts of potassium persulfate as a polymerization initiator. These materials were sufficiently stirred and were then heated to 60° C. to initiate polymerization. Polymerization was continued until the polymerization conversion rate reached 96% to yield a water dispersion containing a non-core-shell structure particulate polymer.

Comparative Example 4

A particulate polymer was produced in the same way as in the production method of the particulate polymer A in Example 1 with the exception that the types and proportions of monomers used for core portion formation and for shell portion formation were changed as indicated in Table 1, the amount of the monomer mixture for core portion formation was changed to 28.5 parts, and the amount of the monomer mixture for shell portion formation was changed to 71.5 parts (i.e., the proportion constituted by the core portion among the total of the core portion and the shell portion was changed to 28.5%). The obtained particulate polymer had a core-shell structure in which a shell portion partially covered the outer surface of a core portion. A particulate polymer B, a functional layer binder, a composition for a functional layer, a separator, a negative electrode, a positive electrode, and a secondary battery were produced in the same way as in Example 1 with the exception that this particulate polymer was used instead of the particulate polymer A. Measurements and evaluations were performed in the same way as in Example 1. The results are shown in Table 2.

Comparative Example 5

A particulate polymer was produced in the same way as in the production method of the particulate polymer A in Example 1 with the exception that the types and proportions of monomers used for core portion formation and for shell portion formation were changed as indicated in Table 1, the amount of the monomer mixture for core portion formation was changed to 16.5 parts, and the amount of the monomer mixture for shell portion formation was changed to 83.5 parts (i.e., the proportion constituted by the core portion among the total of the core portion and the shell portion was changed to 16.5%). The obtained particulate polymer had a core-shell structure in which a shell portion partially covered the outer surface of a core portion. Next, a functional layer binder, a composition for a functional layer, a separator, a negative electrode, a positive electrode, and a secondary battery were produced in the same way as in Example 1 with the exception that 80 parts in terms of solid content of this particulate polymer and 20 parts in terms of solid content of a particulate polymer obtained as described below that had a glass-transition temperature of lower than 80° C. were used instead of the particulate polymers A and B in production of the composition for a functional layer. Measurements and evaluations were performed in the same way as in Example 1. The results are shown in Table 2.

<Production of Particulate Polymer having Glass-Transition Temperature of Lower than 80° C.>

A 5 MPa pressure vessel equipped with a stirrer was charged with 0.1 parts of methacrylic acid, 0.1 parts of acrylic acid, 5.1 parts of methyl methacrylate, 1 part of butyl acrylate, 1 part of butyl methacrylate, 60 parts of 2-ethylhexyl acrylate, 25 parts of cyclohexyl methacrylate, 2 parts of 2-hydroxyethyl methacrylate, 5 parts of acrylamide, 0.7 parts of trimethylolpropane triacrylate (produced by Shin-Nakamura Chemical Co., Ltd.; product name: A-TMPT), 150 parts of deionized water, and 0.5 parts of potassium persulfate as a polymerization initiator. These materials were sufficiently stirred and were then heated to 60° C. to initiate polymerization. Polymerization was continued until the polymerization conversion rate reached 96% to yield a water dispersion containing a particulate polymer. The particulate polymer had a glass transition temperature of −30° C.

In Tables 1 and 2, shown below:
"AN" indicates acrylonitrile unit;
"MMA" indicates methyl methacrylate unit;
"BA" indicates butyl acrylate unit;
"BMA" indicates butyl methacrylate unit;
"2EHA" indicates 2-ethylhexyl acrylate unit;
"CHMA" indicates cyclohexyl methacrylate unit;
"AA" indicates acrylic acid unit;
"MAA" indicates methacrylic acid unit;
"HEMA" indicates 2-hydroxyethyl methacrylate unit;
"EDMA" indicates ethylene glycol dimethacrylate unit;
"GMA" indicates glycidyl methacrylate unit;
"TMPT" indicates trimethylolpropane triacrylate unit;
"AcSi" indicates γ-methacryloxypropyltrimethoxysilane unit;
"AMA" indicates allyl methacrylate unit;
"AAm" indicates acrylamide unit;
"ST" indicates styrene unit;
"AV" indicates aromatic vinyl polymer; and
"ACL" indicates acrylic polymer.

TABLE 1

| | | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|
| Particulate polymer A, etc. | Core portion chemical composition [mass %] | (Meth)acrylonitrile monomer unit | AN | 39 | 39 | 39 | 39 | 39 | 39 | 39 | 39 | 39 | 39 | 39 | 39 |
| | | (Meth)acrylic acid ester monomer unit | MMA | 20 | 20 | 20 | 13 | 3 | 32 | 20 | 20 | 20 | 20 | 20 | 20 |
| | | | BA | 38 | 38 | 38 | 45 | 55 | 26 | 38 | 38 | 38 | 38 | 38 | 38 |
| | | | BMA | — | — | — | — | — | — | — | — | — | — | — | — |
| | | | 2EHA | — | — | — | — | — | — | — | — | — | — | — | — |
| | | | CHMA | — | — | — | — | — | — | — | — | — | — | — | — |
| | | Acid group-containing monomer unit | AA | — | — | — | — | — | — | — | — | — | — | — | — |
| | | | MAA | 2 | 2 | 2 | 2 | 2 | 2 | 2 | 2 | 2 | 2 | 2 | 2 |
| | | | HEMA | — | — | — | — | — | — | — | — | — | — | — | — |
| | | Crosslinkable monomer unit | EDMA | 1 | 1 | 1 | 1 | 1 | 1 | 1 | 1 | 1 | 1 | 1 | 1 |
| | | | GMA | — | — | — | — | — | — | — | — | — | — | — | — |
| | | | TMPT | — | — | — | — | — | — | — | — | — | — | — | — |
| | | | AcSi | — | — | — | — | — | — | — | — | — | — | — | — |
| | | Other monomer units | AAm | — | — | — | — | — | — | — | — | — | — | — | — |
| | Shell portion chemical composition [mass %] | (Meth)acrylic acid ester monomer unit | MMA | — | 30 | 37 | — | — | — | — | — | — | — | — | — |
| | | | BA | 97.7 | 67.7 | 60.7 | 97.7 | 97.7 | 97.7 | 97.7 | 97.7 | 97.7 | 97.7 | 97.7 | 97.7 |
| | | | 2EHA | — | — | — | — | — | — | — | — | — | — | — | — |
| | | Acid group-containing monomer unit | MAA | 2 | 2 | 2 | 2 | 2 | 2 | 2 | 2 | 2 | 2 | 2 | 2 |
| | | | HEMA | — | — | — | — | — | — | — | — | — | — | — | — |
| | | Crosslinkable monomer unit | AMA | 0.3 | 0.3 | 0.3 | 0.3 | 0.3 | 0.3 | 0.3 | 0.3 | 0.3 | 0.3 | 0.3 | 0.3 |
| | | | GMA | — | — | — | — | — | — | — | — | — | — | — | — |
| | | | TMPT | — | — | — | — | — | — | — | — | — | — | — | — |
| | | | AcSi | — | — | — | — | — | — | — | — | — | — | — | — |
| | | Other monomer unit | AAm | — | — | — | — | — | — | — | — | — | — | — | — |
| Particulate polymer B, etc. | Chemical composition [mass %] | Aromatic vinyl monomer unit | ST | 100 | 100 | 100 | 100 | 100 | 100 | 100 | 100 | 100 | 94 | 100 | 100 |
| | | (Meth)acrylic acid ester monomer unit | MMA | — | — | — | — | — | — | — | — | — | — | — | — |
| | | | BA | — | — | — | — | — | — | — | — | — | 6 | — | — |
| | | | BMA | — | — | — | — | — | — | — | — | — | — | — | — |
| | | | 2EHA | — | — | — | — | — | — | — | — | — | — | — | — |
| | | | CHMA | — | — | — | — | — | — | — | — | — | — | — | — |
| | | Acid group-containing monomer unit | AA | — | — | — | — | — | — | — | — | — | — | — | — |
| | | | MAA | — | — | — | — | — | — | — | — | — | — | — | — |
| | | | HEMA | — | — | — | — | — | — | — | — | — | — | — | — |
| | | Crosslinkable monomer unit | TMPT | — | — | — | — | — | — | — | — | — | — | — | — |
| | | Other monomer units | AAm | — | — | — | — | — | — | — | — | — | — | — | — |

TABLE 1-continued

| | | | Example 13 | Example 14 | Example 15 | Example 16 | Example 17 | Comparative Example 1 | Comparative Example 2 | Comparative Example 3 | Comparative Example 4 | Comparative Example 5 |
|---|---|---|---|---|---|---|---|---|---|---|---|---|
| Particulate polymer A, etc. | Core portion chemical composition [mass %] | (Meth)acrylonitrile monomer unit | AN | 39 | 39 | 39 | 39 | 39 | 39 | 39 | — (*) | — | — |
| | | (Meth)acrylic acid ester monomer unit | MMA | 20 | 20 | 15 | 20 | 20 | 20 | 20 | | 69.1 | 5.1 |
| | | | BA | 38 | 38 | 43 | 38 | 38 | 38 | 38 | | 18.3 | 1 |
| | | | BMA | — | — | — | — | — | — | — | | — | — |
| | | | 2EHA | — | — | — | — | — | — | — | | 1.9 | 60 |
| | | | CHMA | — | — | — | — | — | — | — | | — | 25 |
| | | Acid group-containing monomer unit | AA | 2 | 2 | 2 | 2 | 2 | 2 | 2 | | 0.1 | 0.1 |
| | | | MAA | — | — | — | — | — | — | — | | 0.1 | 0.1 |
| | | Crosslinkable monomer unit | HEMA | 1 | 1 | 1 | 1 | 1 | 1 | 1 | | 1.9 | 2 |
| | | | EDMA | — | — | — | — | — | — | — | | — | — |
| | | | GMA | — | — | — | — | — | — | — | | 2.7 | — |
| | | | TMPT | — | — | — | — | — | — | — | | 0.7 | 0.7 |
| | | | AcSi | — | — | — | — | — | — | — | | 0.3 | — |
| | | Other monomer units | AAm | — | — | — | — | — | — | — | | 4.8 | 5 |
| | Shell portion chemical composition [mass %] | (Meth)acrylic acid ester monomer unit | MMA | 97.7 | — | — | — | — | 47 | — (*) | — | 38.4 | 70.7 |
| | | | BA | — | 97.7 | 97.7 | — | — | 50.7 | | 97.7 | 19.5 | 18.7 |
| | | | 2EHA | — | — | — | 97.7 | 97.7 | — | | — | 31.8 | 2.0 |
| | | Acid group-containing monomer unit | AA | 2 | 2 | 2 | 2 | 2 | 2 | | 2 | 0.1 | 0.1 |
| | | | MAA | — | — | — | — | — | — | | — | 0.1 | 0.1 |
| | | Crosslinkable monomer unit | HEMA | — | — | — | — | — | — | | — | 2 | 2 |
| | | | AMA | — | — | — | — | — | — | | — | 2.8 | 1.0 |
| | | | GMA | 0.3 | 0.3 | 0.3 | 0.3 | 0.3 | 0.3 | | 0.3 | 0.2 | 0.4 |
| | | | TMPT | — | — | — | — | — | — | | — | 0.1 | 0.2 |
| | | | AcSi | — | — | — | — | — | — | | — | — | — |
| | | Other monomer units | AAm | — | — | — | — | — | — | | — | 5 | 4.9 |
| Particulate polymer B, etc. | Chemical composition [mass %] | Aromatic vinyl monomer unit | ST | 100 | 100 | 100 | 100 | 100 | 100 | 100 | 100 | 100 | — |
| | | (Meth)acrylic acid ester monomer unit | MMA | — | — | — | — | — | — | — | — | — | 5.1 |
| | | | BA | — | — | — | — | — | — | — | — | — | 1 |
| | | | BMA | — | — | — | — | — | — | — | — | — | — |
| | | | 2EHA | — | — | — | — | — | — | — | — | — | 60 |
| | | | CHMA | — | — | — | — | — | — | — | — | — | 25 |
| | | Acid group-containing monomer unit | AA | — | — | — | — | — | — | — | — | — | 0.1 |
| | | | MAA | — | — | — | — | — | — | — | — | — | 0.1 |
| | | Crosslinkable monomer unit | HEMA | — | — | — | — | — | — | — | — | — | 2 |
| | | | TMPT | — | — | — | — | — | — | — | — | — | 0.7 |
| | | Other monomer units | AAm | — | — | — | — | — | — | — | — | — | 5 |

(*) Non-core-shell structure particulate polymer used in Comparative Examples 2 and 3

TABLE 2

| | | Example 1 | Example 2 | Example 3 | Example 4 | Example 5 | Example 6 | Example 7 | Example 8 | Example 9 |
|---|---|---|---|---|---|---|---|---|---|---|
| Particulate polymer A, etc. | Structure | Core-shell | Core-shell | Core-shell | Core-shell | Core-shell | Core-shell | Core-shell | Core-shell | Core-shell |
| | Core portion glass-transition temperature [° C.] | 60 | 60 | 60 | 45 | 28 | 78 | 60 | 60 | 60 |
| | Shell portion glass-transition temperature [° C.] | −50 | 10 | 25 | −50 | −50 | −50 | −50 | −50 | −50 |
| | Glass-transition temperature (non-core-shell) [° C.] | — | — | — | — | — | — | — | — | — |
| | Proportion constituted by core portion among total of core portion and shell portion [mass %] | 70 | 70 | 70 | 70 | 70 | 70 | 50 | 70 | 70 |
| | Degree of swelling in electrolyte solution [mass %] | 300 | 320 | 350 | 300 | 300 | 300 | 300 | 300 | 300 |
| | Volume-average particle diameter [nm] | 510 | 510 | 510 | 510 | 510 | 510 | 510 | 400 | 300 |
| | Amount [parts by mass] | 50 | 50 | 50 | 50 | 50 | 50 | 50 | 50 | 50 |
| Particulate polymer B, etc. | Type | AV | AV | AV | AV | AV | AV | AV | AV | AV |
| | Glass-transition temperature [° C.] | 100 | 100 | 100 | 100 | 100 | 100 | 100 | 100 | 100 |
| | Volume-average particle diameter [nm] | 250 | 250 | 250 | 250 | 250 | 250 | 250 | 250 | 250 |
| | Amount [parts by mass] | 50 | 50 | 50 | 50 | 50 | 50 | 50 | 50 | 50 |
| Functional layer binder | Type | ACL | ACL | ACL | ACL | ACL | ACL | ACL | ACL | ACL |
| | Amount [parts by mass] | 10 | 10 | 10 | 10 | 10 | 10 | 10 | 10 | 10 |
| Proportion constituted by particulate polymer A among total of particulate polymers A and B [mass %] | | 50 | 50 | 50 | 50 | 50 | 50 | 50 | 50 | 50 |
| Process adhesiveness | | A | B | B | A | A | A | A | B | C |
| Blocking resistance | | A | A | A | B | B | A | A | A | A |
| Wet adhesiveness | | A | A | A | A | A | B | A | A | A |

| | | Example 10 | Example 11 | Example 12 | Example 13 | Example 14 | Example 15 | Example 16 | Example 17 |
|---|---|---|---|---|---|---|---|---|---|
| Particulate polymer A, etc. | Structure | Core-shell | Core-shell | Core-shell | Core-shell | Core-shell | Core-shell | Core-shell | Core-shell |
| | Core portion glass-transition temperature [° C.] | 60 | 60 | 60 | 60 | 60 | 50 | 60 | 60 |
| | Shell portion glass-transition temperature [° C.] | −50 | −50 | −50 | −50 | −50 | −65 | −50 | −50 |
| | Glass-transition temperature (non-core-shell) [° C.] | — | — | — | — | — | — | — | — |
| | Proportion constituted by core portion among total of core portion and shell portion [mass %] | 70 | 70 | 70 | 70 | 70 | 70 | 70 | 70 |
| | Degree of swelling in electrolyte solution [mass %] | 300 | 300 | 300 | 300 | 300 | 200 | 300 | 300 |
| | Volume-average particle diameter [nm] | 510 | 510 | 510 | 510 | 510 | 510 | 510 | 510 |
| | Amount [parts by mass] | 50 | 30 | 90 | 60 | 10 | 50 | 50 | 50 |
| Particulate polymer B, etc. | Type | AV | AV | AV | AV | AV | AV | AV | AV |
| | Glass-transition temperature [° C.] | 85 | 100 | 100 | 100 | 100 | 100 | 100 | 100 |
| | Volume-average particle diameter [nm] | 250 | 250 | 250 | 250 | 250 | 250 | 510 | 250 |
| | Amount [parts by mass] | 50 | 70 | 10 | 40 | 90 | 50 | 50 | 50 |
| Functional layer binder | Type | ACL | ACL | ACL | ACL | ACL | ACL | ACL | — |
| | Amount [parts by mass] | 10 | 10 | 10 | 10 | 10 | 10 | 10 | — |
| Proportion constituted by particulate polymer A among total of particulate polymers A and B [mass %] | | 50 | 30 | 90 | 60 | 10 | 50 | 50 | 50 |

TABLE 2-continued

| | | | | | | | | | |
|---|---|---|---|---|---|---|---|---|---|
| Process adhesiveness | | A | A | A | A | B | A | B | A |
| Blocking resistance | | B | A | B | B | A | B | A | A |
| Wet adhesiveness | | A | A | A | A | B | A | A | A |

| | | Comparative Example 1 | Comparative Example 2 | Comparative Example 3 | Comparative Example 4 | Comparative Example 5 |
|---|---|---|---|---|---|---|
| Particulate polymer A, etc. | Structure | Core-shell | Non-Core-shell | Non-Core-shell | Core-shell | Core-shell |
| | Core portion glass-transition temperature [° C.] | 60 | — | — | 55 | −30 |
| | Shell portion glass-transition temperature [° C.] | 40 | — | — | −6 | 55 |
| | Glass-transition temperature (non-core-shell) [° C.] | — | 60 | −50 | — | — |
| | Proportion constituted by core portion among total of core portion and shell portion [mass %] | 70 | — | — | 28.5 | 16.5 |
| | Degree of swelling in electrolyte solution [mass %] | 370 | 250 | 410 | 550 | 480 |
| | Volume-average particle diameter [nm] | 510 | 510 | 510 | 750 | 580 |
| | Amount [parts by mass] | 50 | 50 | 50 | 50 | 80 |
| Particulate polymer B, etc. | Type | AV | AV | AV | AV | ACL |
| | Glass-transition temperature [° C.] | 100 | 100 | 100 | 100 | −30 |
| | Volume-average particle diameter [nm] | 250 | 250 | 250 | 250 | 160 |
| | Amount [parts by mass] | 50 | 50 | 50 | 50 | 20 |
| Functional layer binder | Type | ACL | ACL | ACL | ACL | ACL |
| | Amount [parts by mass] | 10 | 10 | 10 | 10 | 10 |
| Proportion constituted by particulate polymer A among total of particulate polymers A and B [mass %] | | 50 | 50 | 50 | 50 | 80 |
| Process adhesiveness | | D | D | D | C | D |
| Blocking resistance | | A | A | C | C | B |
| Wet adhesiveness | | B | B | B | B | B |

It can be seen from Tables 1 and 2 that it was possible to cause a battery member including a functional layer to display excellent blocking resistance and process adhesiveness in a good balance and to provide good wet adhesiveness in Examples 1 to 17 in which a composition for a functional layer was used that contained a particulate polymer A having a core-shell structure in which the glass-transition temperatures of polymers of a core portion and a shell portion were within the prescribed ranges and in which the core portion proportion was within the prescribed range.

In contrast, process adhesiveness of a battery member including a functional layer decreased in Comparative Example 1 in which a composition for a functional layer was used that contained, instead of the particulate polymer A, a particulate polymer that had a core-shell structure, but for which the glass-transition temperature of a polymer of the shell portion was higher than 25° C.

Process adhesiveness of a battery member including a functional layer also decreased in Comparative Example 2 in which a particulate polymer that had a high glass-transition temperature (60° C.) and did not have a core-shell structure was used instead of the particulate polymer A.

Moreover, process adhesiveness and blocking resistance of a battery member including a functional layer decreased in Comparative Example 3 in which a particulate polymer that had a low glass-transition temperature (−50° C.) and did not have a core-shell structure was used instead of the particulate polymer A.

Furthermore, blocking resistance of a battery member including a functional layer, in particular, decreased in Comparative Example 4 in which a particulate polymer having a core-shell structure in which the glass-transition temperatures of polymers of a core portion and a shell portion were within the prescribed ranges but in which the core portion proportion fell below 30 mass % was used instead of the particulate polymer A.

Also, process adhesiveness of a battery member including a functional layer decreased in Comparative Example 5 in which a particulate polymer having a core-shell structure in which the glass-transition temperature of a polymer of a core portion was 25° C. or lower, the glass-transition temperature of a polymer of a shell portion was higher than 25° C., and the core portion proportion fell below 30 mass % was used instead of the particulate polymer A and in which a particulate polymer having a glass-transition temperature of lower than 80° C. was used instead of the particulate polymer B.

INDUSTRIAL APPLICABILITY

According to the present disclosure, it is possible to provide a composition for a non-aqueous secondary battery functional layer capable of forming a functional layer that can provide a battery member such as an electrode or a separator with both excellent blocking resistance and excellent process adhesiveness.

Moreover, according to the present disclosure, it is possible to provide a functional layer that can provide a battery member such as an electrode or a separator with both excellent blocking resistance and excellent process adhesiveness and a non-aqueous secondary battery including this functional layer.

REFERENCE SIGNS LIST 100 particulate polymer A
110 core portion
110S outer surface of core portion
120 shell portion

The invention claimed is:

1. A composition for a non-aqueous secondary battery functional layer comprising a particulate polymer A and a particulate polymer B, wherein
the particulate polymer A has a core-shell structure including a core portion and a shell portion that at least partially covers an outer surface of the core portion,
the core portion is formed from a polymer having a glass-transition temperature of higher than 25° C. and lower than 80° C.,
the shell portion is formed from a polymer having a glass-transition temperature of not lower than 80° C. and not higher than 25° C.,
a proportion constituted by the core portion among a total of the core portion and the shell portion is not less than 30 mass % and not more than 80 mass %,
the particulate polymer B has a glass-transition temperature of 80° C. or higher, and
a proportion constituted by the particulate polymer A among a total of the particulate polymer A and the particulate polymer B is not less than 5 mass % and not more than 70 mass %.

2. The composition for a non-aqueous secondary battery functional layer according to claim 1, wherein the particulate polymer A has a volume-average particle diameter that is at least as large as a volume-average particle diameter of the particulate polymer B.

3. The composition for a non-aqueous secondary battery functional layer according to claim 1, wherein the particulate polymer A has a volume-average particle diameter of 200 nm or more.

4. The composition for a non-aqueous secondary battery functional layer according to claim 1, wherein the shell portion partially covers the outer surface of the core portion.

5. A functional layer for a non-aqueous secondary battery formed using the composition for a non-aqueous secondary battery functional layer according to claim 1.

6. A non-aqueous secondary battery comprising the functional layer for a non-aqueous secondary battery according to claim 5.

* * * * *